United States Patent [19]

Payrhammer

[11] 4,176,944
[45] Dec. 4, 1979

[54] CORRECTLY POSITIONING SUCCESSIVE ORIGINALS OF A PHOTOGRAPHIC STRIP AT A COPYING OR SEVERING STATION

[75] Inventor: Bernd Payrhammer, Munich, Fed. Rep. of Germany

[73] Assignee: AGFA-Gevaert, A.G., Leverkusen, Fed. Rep. of Germany

[21] Appl. No.: 902,267

[22] Filed: May 2, 1978

[30] Foreign Application Priority Data

May 12, 1977 [DE] Fed. Rep. of Germany ....... 2721368

[51] Int. Cl.² ..................... G03B 27/52; G06K 7/015; B65H 23/18
[52] U.S. Cl. ........................................ 355/18; 355/29; 355/41; 250/557; 226/33
[58] Field of Search .................. 355/18, 28, 29, 41, 355/50, 97, 40; 250/548, 557, 561, 570; 353/26 A; 226/29, 45, 48, 27, 33

[56] References Cited

U.S. PATENT DOCUMENTS

| | | | |
|---|---|---|---|
| 3,148,585 | 9/1964 | Armstrong et al. | 355/18 |
| 3,614,455 | 10/1971 | Paulus | 250/557 |
| 3,874,791 | 4/1975 | Thieme et al. | 355/41 |
| 3,963,937 | 6/1976 | Inoue et al. | 250/570 |

Primary Examiner—John Gonzales
Assistant Examiner—W. J. Brady
Attorney, Agent, or Firm—Michael J. Striker

[57] ABSTRACT

Each original has a notch. A notch detector is located a distance Z upstream of the point at which the notch centerline is later to be stopped, and generates a notch-start and a notch-end pulse. A transducer generates strip-increment pulses during strip transport. In response to a notch-start pulse first and second counters start counting the strip-increment pulses, the first counting the Z distance, the second counting the notch length N. A divider ascertains the notch half-length N/2, which is then stored. When the counting of the Z-distance is finished, strip transport is not immediately stopped, and instead is stopped only after the counting of a further number of strip-increment pulses corresponding to the length N/2, whereupon transport is stopped. This references the system to the reliable centerlines of variable-length notches, instead of the leading ends of the notches, and assures correct positioning when transport is stopped.

10 Claims, 3 Drawing Figures

CORRECTLY POSITIONING SUCCESSIVE ORIGINALS OF A PHOTOGRAPHIC STRIP AT A COPYING OR SEVERING STATION

BACKGROUND OF THE INVENTION

The invention relates to the correct positioning of successive originals in a photographic strip at a copying station, a severing station, or the like, based upon the optical detection of reference marks, usually notches associated with the successive originals.

When a photographic strip is transported through a copying station, original by original, it is important that strip transport be stopped each time with the original correctly positioned. This is likewise true for stopping transport of such strip at a severing station, at which a cut is to be made exactly midway between successive originals. To establish correct positioning, such strips are conventionally provided with edge notches, one per original, and very accurately located relative to the leading and trailing ends of the respective originals. Such notches are for example provided by first running the strip through an automatic notcher, and the notches are typically of semicircular or triangular shape. In particular it is the centerlines of the notches which are spatially correlated with the respective originals. The centerlines are lines extending perpendicular to the longitudinal direction of the strip and symmetrically bisecting the notches.

Such automatic markers are very reliable with respect to establishment of such centerlines; i.e., the centerlines are typically perfectly placed and not upstream or downstream of the correct location. In contrast, the depth to which the notch extends from the edge of the strip towards the longitudinal centerline of the strip typically exhibits a certain amount of variation. This is traceable to problems of guiding the strip through the automatic notcher. The strip sometimes moves in transverse direction small distances towards and away from the actual notching element. When the notches are semicircular, triangular or otherwise not rectangular, this variation in penetration depth results in corresponding variation in the length of the notch measured in the direction of strip elongation at the notched edge of the strip. Conventional notch-referenced positioning systems of the type in question are referenced to the leading ends of the notches. However, because of the variation in the notch length, there is corresponding variation in the distance between the leading end of a notch and its centerline. As a result, there is corresponding variation in the positioning of successive originals when strip transport is interrupted, e.g., the positioning of successive originals at the copying or severing station.

SUMMARY OF THE INVENTION

It is accordingly a general object of the invention to provide a mark-referenced positioning system of the type in question, but whose accuracy does not decrease if it happens to be presented with notches, or equivalent marks not involving the removal of strip material, of variable size.

According to the most general concept of the invention, this is achieved by controlling the stepwise transport of the photographic strip not merely in dependence upon the detection of such marks per se, but furthermore in dependence upon the positively sensed lengths of the marks.

Preferably, if Z is the distance from the notch-sensing element of the optical notch detector to the point where the centerline of the notch is to be located when the respective original is stopped, and if the notch length is a variable N, then the system responds to the sensing of the leading end of the notch by transporting the associated original a distance $Z+N/2$, before stopping strip transport for that particular original.

The inventive system finds ready applicaton to processing of photographic strips received with different markings or notches, e.g., from different notchers, and of course can also be used when the variable notchlength problem discussed above is not actually encountered on some strips to be processed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
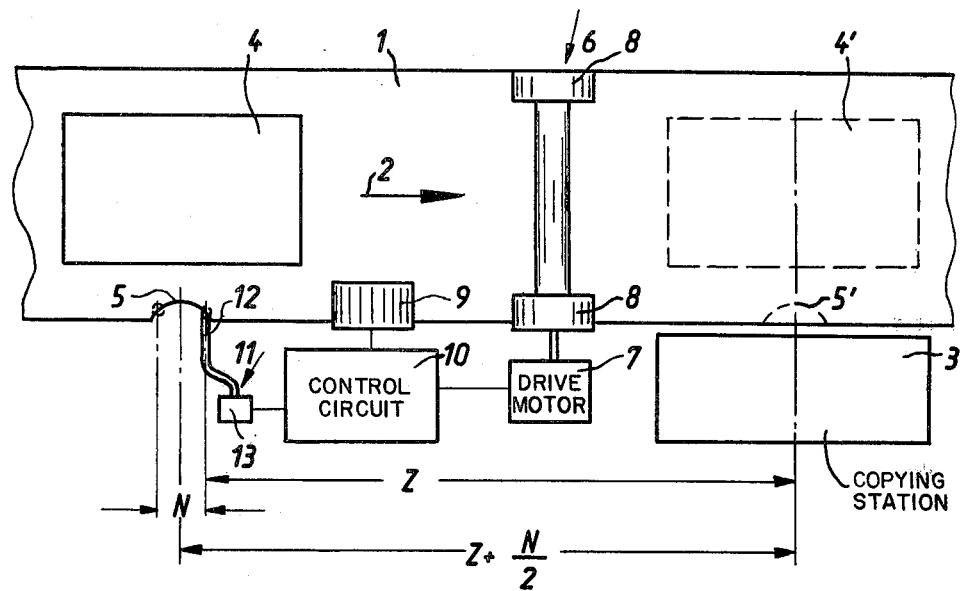
FIG. 1 is a schematic representation of an exemplary embodiment of the invention.

In FIG. 1, numeral 1 denotes a strip of photographic originals, here, for the sake of concreteness, negatives to be copied. The strip 1 is transported through a copying installation in the direction of arrow 2. Numeral 3 denotes the copying station of the installation, at which is properly located one negative 4' of the strip 1, the negative 4' having a notch 5' at one of its lateral edges. The centerline of negative 4' and the centerline of the notch 5' are identical and here coincide with the positioning reference line (shown as a dash-dot line) of the copying station 3.

Alongside the copying station 3, there is provided a transport stage 6, mainly comprised of a drive motor 7 and motor-driven transport rollers 8. Located near the transport stage 6 is a strip-increment pulse generator 9, shown here as including a rotary member which rolls upon and is passively driven by the transported strip 1. Pulse generator 9 generates one output pulse per small increment of strip transport, and applies the strip-increment pulses to a control circuit 10. Of course, the pulse generator 9, instead of including a separate element engaging the strip 1, could work off one of the transport rollers 8, or the like.

Also feeding pulses to the control circuit 10 is a notch detector unit 11, comprising a light-conductive structure 12 and a light-receiving or light-transmitting and -receiving unit 13. The notch detector arrangement operates on an optical basis, e.g., either transmissive or reflective. If it is to operate on a transmissive basis, the end of the light-conductive structure 12 is located adjacent one major surface of the strip 1 and a (non-illustrated) light source is located adjacent the opposite major surface of the strip, i.e., so that light-conductive structure 12 receives light only when a notch is present between its end and the light source. In that case, unit 13 can be exclusively light-receiving. If the notch detector arrangement is to operate on a reflective basis, the light-conductive structure 12 can be divided into two parts, the ends of which face the same major surface of strip 1, but with one serving to emit light transmitted from a light source, and the other serving to receive such light, upon reflection of such light off the strip surface, and transmit the received reflected light to the photosensitive unit 13. With reflective notch sensing, reflected light is sensed between notches, and the non-sensing of reflected light indicates the notches.

In FIG. 1, a negative 4 provided with a notch 5 (both shown in solid lines) is present at the notch detector unit 11. This negative 4 and notch 5 are to be advanced and stopped in the position presently occupied by negative 4' with its notch 5'.

To achieve this in conventional arrangements, the following is usually done. The notch detector unit, which cannot be readily crammed into the copying station 3 per se for spatial reasons and therefore must be located upstream as shown, generates a simple notch signal when it senses a notch. The simple notch signal starts operation of a backwards-counting counter, whose initial count is set to a value corresponding to the distance from the notch detector unit to the copying station. Thereupon, the counter counts strip-increment pulses, until it has counted down to zero, whereupon strip transport is stopped, it being assumed that the negative whose notch had thusly been detected is now properly positioned at the copying station. However, this positioning assumption is not particularly good in practice, as will be explained with reference to FIG. 2.

Figure 2:
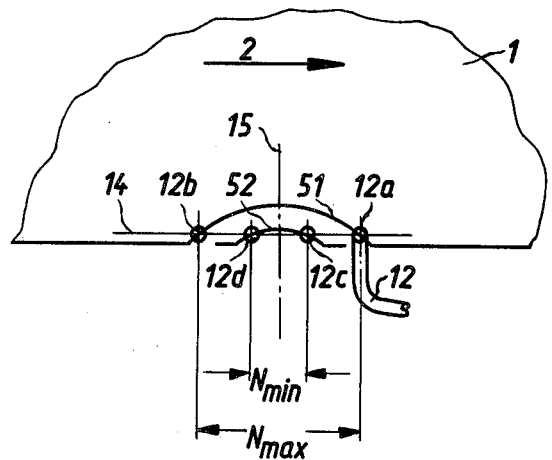
FIG. 2 is an enlarged-scale view of a portion of the edge of the photographic strip having a notch.

FIG. 2 is an enlarged view of a part of the strip 1 at the location of a notch. For explanatory purposes, two notches 51, 52 of respective larger and smaller sizes are shown, indicating the range of variation of the notches which may be formed by the notcher employed. Notchers are typically very accurate in the placement of notches in the direction of strip elongation; the centerline of the notch, i.e., the halfway point between its leading and trailing ends, is reliably correlated with the centerline of the associated negative. However, it often happens that the strip being notched is located at different distances, measured in the direction perpendicular to its elongation, from the notching instrumentality, as a result of which the notches are of greater or lesser depth, and therefore greater or lesser length as measured in the transport direction.

At the notch detecting unit 11, the successive points on the strip which will pass directly past the end of light-conducting structure 12 all lie on line 14 in FIG. 2. As the strip 1 is transported in the direction of arrow 2, the leading end 12a of the largest notch 51, the trailing end 12b thereof, and the leading and trailing ends 12c, 12d of the smallest notch, will be as shown. The distance from 12a to 12b for the largest notch 51 is denoted $N_{max}$, and that from 12c to 12d for the smallest notch 52 is denoted $N_{min}$. By definition, the centerlines 15 of the notches are identical. Clearly, if the notch is as large as biggest notch 51, the leading end of the notch will be detected considerably sooner than in the case of a notch as small as smallest notch 52. In most conventional systems, the aforementioned counter starts counting in response to generation of a leading-end-of-notch signal. Accordingly, the actual position of such negative, when it stops at the copying station, can vary in the transport direction by amounts within a range equal to the distance between 12a and 12c, for example.

The present invention overcomes this difficulty by referencing the strip-transport operations not to the leading ends of the differently sized notches, but instead relative to their centerlines, which are always reliable. Whereas conventional systems typically stop strip transport after a time delay corresponding to a constant distance Z in FIG. 1 (the distance from the leading end of a sensed notch and the reference line at the copying station 3), the present invention stops strip transport after a time delay corresponding to the variable distance $Z+N/2$, as likewise indicated in FIG. 1. This can be accomplished, for example, by using the exemplary control circuit shown in FIG. 3.

Figure 3:
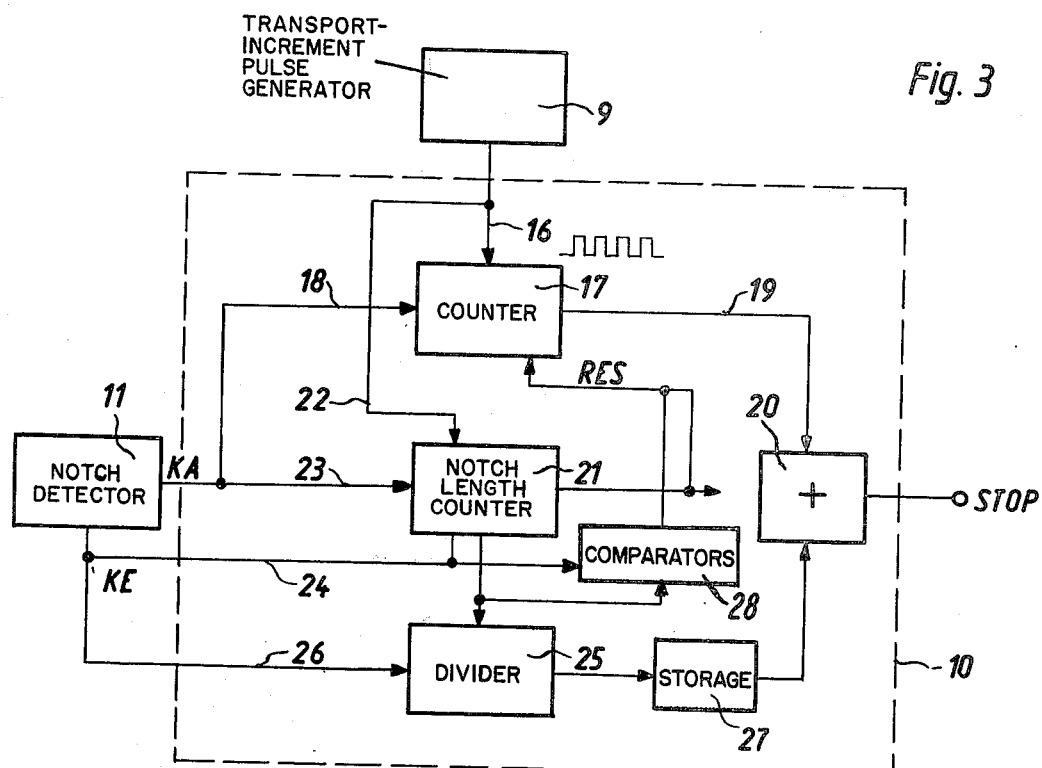
FIG. 3 is a block schematic circuit diagram of one exemplary embodiment of a control circuit embodying the inventive concepts.

FIG. 3 depicts one exemplary version of the internal components of the control circuit 10, and also the strip-increment pulse generator 9 and notch detector unit 11 cooperating therewith.

As already indicated, the strip-increment pulse generator 9 generates one output pulse per predetermined small increment of strip transport. The notch detector unit 11 generates a notch-start pulse KA when it senses the leading end of a notch, and a notch-end pulse KE when it senses the trailing end of a notch. To distinguish between leading and trailing ends of one notch, the notch detector can for example include a differentiator connected to the output of a light sensor, the differentiator producing a positive pulse when the output signal from the sensor is a not-received/received light transition signal, and a negative pulse when the sensor output signal is a received/not-received light transition signal, the output of the differentiator being connected to outputs KA, KE through respective ones of two opposite-polarity diodes, or the like.

In the control circuit 10 per se, the strip-increment pulses from pulse generator 9 are fed via line 16 to the counting input of a backwards counter 17. The KA (notch start) output of unit 11 is connected via a line 18 to the start input of counter 17. The output of counter 17 is connected via a line 19 to one input of an adding unit 20, operative for generating the stop-transport signal per se. A notch-length counter 21 receives strip-increment pulses from pulse generator 9 via a line 22. The KA (notch start) output of unit 11 is connected via a line 23 to the start input of notch-length counter 21. The output of counter 21 is connected to the input of a divider 25. The KE (notch end) output of unit 11 is connected via a line 26 to a control input of divider 25, and also via a line 24 to the stop input of notch-length counter 21. The divider 25 serves to divide the counter notch length N to ascertain the quantity N/2 (see FIG. 1). The output of divider 25 is connected to the input of a storage unit 27, the output of which is connected to another input of the adding unit 20.

The illustrated embodiment operates as follows:

The backwards-counting counter 17 is initially set to a count corresponding to distance Z (FIG. 1). The strip 1 is transported in the direction of arrow 2. As soon as the leading end of a notch, e.g., the largest possible notch 51, is sensed at 12a by element 12, unit 11 generates a KA (notch start) signal. In response, counter 17 begins counting the strip-increment pulses from pulse generator 9, i.e., begins to count the distance Z and notch-length counter 21 begins likewise to count the length N of the notch 51. When the distance Z has actually been counted, however, the notch centerline has not yet reached the positioning reference line at the copying station 3; i.e., it is only the leading end of the notch 51 which has reached the reference line, and the notch centerline is still short of the reference line by the distance N/2 (see FIG. 1). Accordingly, strip transport is not yet stopped, but instead continued for the further distance N/2. This is accomplished by the second (notch-length) counter 21.

As indicated already, notch-length counter 21 starts counting in response to a notch-start signal KA. Counter 21 stops counting in response to a notch-end signal KE. Accordingly, its count when counting is stopped corresponds to the notch length N. Generation of the notch-end signal KE additionally serves to activate the divider 25, which divides the count achieved by notch-length counter 21 in two, i.e., to yield the quantity of interest N/2. The notch-end signal KE, besides activating the divider 25 to divide N by two to yield N/2 also causes divider 25 to thereafter transfer N/2 to a storage unit 27.

It will be appreciated that the distance N/2 is much smaller than the distance N. Accordingly, N/2 is computed and stored rather early on during the counting of distance Z by counter 17. When the counting of distance Z is actually finished, counter 17 applies a pulse to adding unit 20, which responds by counting a number of strip-increment pulses equal to the count stored in storage 27, and after this has been achieved, adding unit 20 generates the stop-transport signal per se, stopping the transported strip with the centerline of the notch 5 and negative 4 in exact coincidence with the positioning reference line at the copying station. The stop-transport signal can also be used to reset all resettable components, e.g., the two counters.

According to a further concept of the invention, the control circuit is additionally to be able to distinguish between true notches and, for example, little tears or cracks in the photographic strip 1. This can for example be done by distinguishing on the basis of notch length. In particular if the counted length N of what is assumed to be a notch is below $N_{min}$ or above $N_{max}$, the control circuit is to recognize that this is not an actual notch. This capability can be implemented fairly straightforwardly, inasmuch as the count on notch-length counter 21 is directly indicative of notch length. Accordingly, unit 21, in addition to the notch-length counter per se, could furthermore include first and second comparators, as indicated at 28 in FIG. 3, one operative for ascertaining whether the counted notch length is below $N_{min}$ and the other operative for ascertaining whether the counted notch length is above $N_{max}$, these comparators being operative for only a brief interval in response to notch-end signal KE, i.e., being operative only after the counting of the length of what is assumed to be a notch is actually finished. If one or the other comparator generates an output signal, indicating that what has been sensed is not a notch within the prescribed length limits, such output signal is used to immediately reset all resettable elements, e.g., the notch-length counter in unit 21 and the Z-distance counter, thereby discontinuing the counting of distance Z and preventing the strip transport from being stopped at a meaningless point.

Certain simplifications of the circuit illustrated and described above can be made. In FIG. 3, the divider 25 is connected to the output of notch-length counter 21, and therefore calculates what one half the counted notch length is. Instead of such a calculating divider, use could be made of a simple frequency divider (in particular a frequency-halver) connected between the output of the pulse generator 9 and the counting input of notch-length counter 21, the frequency divider being operative for transmitting to notch-length counter 21 only every second pulse emitted by pulse generator 9. If this is done, then when notch-end signal KE stops the counting performed by notch-length counter 21, the count on counter 21 will directly correspond to the distance N/2. Counter 21 would accordingly become per se a half-notch-length counter. Inasmuch as a counter can also be used as a storage device, this would make it possible to eliminate storage unit 26, i.e., because the count on half-notch-length counter would already be the same as the count which storage unit 26 stores in FIG. 3.

If counter 21 is thusly made a half-notch-length counter, and if it is desired to distinguish true notches from cracks and tears in the manner already explained, the only modification would be that the two comparators described above would compare the count on counter 21 not against $N_{min}$ and $N_{max}$, but instead against $N_{min}/2$ and $N_{max}/2$.

Another simplification which could be made is to eliminate the need for adding unit 20 to have counting capability. In FIG. 3, counter 17 generates an output pulse when counting of the Z-distance has been finished, and this pulse causes adding unit 20 to, in effect, add N/2 to Z, by counting a further number of strip-increment pulses from pulse generator 9, i.e., the further number being equal to the value N/2 stored in storage unit 26. Particularly if counter 21 is made a half-notch-length counter in the manner already described, the counting capability of adding unit 20 can be avoided, and unit 21 replaced by a simple AND-gate, provided that a forwards-backwards counter is used for counter 21. In that event that notch-start pulse KA would start counter 21 counting up from zero in forwards-counting direction, the notch-end pulse KE would stop this forwards counting, and thereafter counter 21 would indefnitely store the half-notch-length value N/2. When counter 17 has finished counting the Z-distance and produces an output signal, but in this event a persisting signal, this signal would first disconnect the counting-input of counter 21 from the frequency-halver and connect it instead directly to the output of pulse generator 9 and, secondly, switch counter 21 over to backwards counting. Then when the N/2 count on counter 21 had been reduced back to zero, a comparator connected to the output of counter 21 and responsive to zero-count would produce a comparator output signal. The comparator output signal, and also the persisting output signal from counter 17, would be applied to the two inputs of unit 20, which could then be a simple AND-gate, responding to this by producing at its output the transport-stop signal. As before, the transport-stop signal can be furthermore used to reset resettable components in the circuit.

Whereas the invention has been described above with respect to the correct positioning of successive negatives of a strip at the copying station of a copying installation, it is to be understood that this is only exemplary. Likewise contemplated are analogous positioning problems for other photographic strips, e.g., the positioning of successive prints at a severing station, the positioning of successive negatives or transparencies at such severing station, and so forth.

It will be understood that each of the elements described above, or two or more together, may also find a useful application in other types of constructions and circuitry differing from the types described above.

While the invention has been illustrated and described as embodied in the context of a particular type of copier, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In an apparatus for the processing of photographic strips comprised of successive originals transported along a predetermined path, and including a station at which successive originals of the transported strip are to be stopped with accurate positioning of the originals at such station, the originals of the photographic strip being provided with spatially correlated optically detectable reference marks, a positioning arrangement comprising transport means for transporting the strip along the predetermined path through such station; optical mark-sensing means located upstream of such station a predetermined distance and operative for detecting the leading and trailing ends of reference marks on the strip; and control circuit means connected to the transport means and to the optical mark-sensing means and operative for stopping an original whose reference mark has been sensed by the mark-sensing means at the proper position at such station by delaying the stopping of such original at such station by a time interval dependent upon the distance between the leading and trailing ends of the sensed reference mark associated with that original.

2. In an apparatus as defined in claim 1, the control circuit means including means operative for calculating a value correlated with the distance between the leading and trailing ends of the sensed reference mark.

3. In an apparatus as defined in claim 1, the apparatus being of the type wherein each original is to be stopped at such station with the midway point between the leading and trailing ends of the respective reference mark located coincident with a reference line at such station, the distance between the mark-sensing means and the reference line being Z, the control means comprising means responsive to the sensing of the leading end of a reference mark by stopping the original associated with that mark after such original has been transported a distance equal to $Z + N/2$, wherein N is the distance between the leading and trailing ends of the reference mark.

4. In an apparatus as defined in claim 1, the optical mark-sensing means comprising a light-conductive structure having an end located to be passed by the reference marks of the transported photographic strip.

5. In an apparatus as defined in claim 1, the control circuit means including pulse-generating means operative for generating strip-increment pulses during strip transport, and mark-length counting means responding to the sensing of the leading end of a reference mark by starting to count strip-increment pulses and responding to the sensing of the trailing end of a reference mark by ceasing to count strip-increment pulses, to thereby count a value correlatable with the distance between the leading and trailing ends of the reference mark.

6. In an apparatus as defined in claim 5, the counting means being provided with divider means cooperating with the counting means to form a value directly corresponding to one half the distance between the leading and trailing ends of the reference mark.

7. In an apparatus as defined in claim 6, the divider means being connected to the output of the counting means for dividing the count on the latter by two.

8. In an apparatus as defined in claim 5, the control circuit means further including storing means operative for storing a value dependent upon the count achieved by the counting means during the time that the sensed reference mark is transported from the mark-sensing means to the station at which the associated original is to be stopped.

9. In an apparatus as defined in claim 3, the control means including pulse-generating means operative for generating strip-increment pulses during strip transport, first counting means responding to the sensing of the leading end of a reference mark by starting to count strip-increment pulses and upon reaching a count corresponding to the distance Z generating a first signal, second counting means responding to the sensing of the leading end of the reference mark by starting to count strip-increment pulses and responding to the sensing of the trailing end of the reference mark by ceasing to count strip-increment pulses to thereby form a count whose value is correlated with the distance between the leading and trailing ends of the reference mark, and adding means operative for generating a stop-transport signal in dependence upon the generation of said first signal and furthermore in dependence upon the count formed by the second counting means.

10. In an apparatus as defined in claim 5, the control circuit including means operative for preventing the stopping of the strip in response to false marks including means for automatically ascertaining whether or not the count formed by the counting means is within a predetermined range.

* * * * *